(12) United States Patent
Krebs et al.

(10) Patent No.: US 7,032,497 B2
(45) Date of Patent: Apr. 25, 2006

(54) VACUUM BRAKE BOOSTER

(75) Inventors: Stephan Krebs, Eschborn (DE);
Wilfried Wagner, Hüttenberg (DE);
Hans-Jörg Feigel, Rosbach (DE);
Holger von Hayn, Bad Vilbel (DE);
Jürgen Schonlau, Walluf (DE);
Manfred Rüffer, Sulzbach (DE);
Wolfgang Ritter, Oberursel/Ts. (DE);
Milan Klimes, Zornheim (DE); Torsten Queisser, Frankfurt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 9 days.

(21) Appl. No.: 10/498,945

(22) PCT Filed: Jan. 24, 2003

(86) PCT No.: PCT/EP03/00735

§ 371 (c)(1),
(2), (4) Date: Jun. 15, 2004

(87) PCT Pub. No.: WO03/064231

PCT Pub. Date: Aug. 7, 2003

(65) Prior Publication Data

US 2005/0039596 A1    Feb. 24, 2005

(30) Foreign Application Priority Data

Jan. 28, 2002    (DE) ................... 102 03 411

(51) Int. Cl.
*F15B 9/10* (2006.01)
(52) U.S. Cl. ........................ 91/369.3; 60/329
(58) Field of Classification Search ............... 91/369.3, 91/376 R; 60/329
See application file for complete search history.

(56) References Cited

U.S. PATENT DOCUMENTS

| 4,469,009 A | 9/1984 | Takayama et al. |
| 4,951,550 A | 8/1990 | Ohki et al. |

(Continued)

FOREIGN PATENT DOCUMENTS

DE    32 10 125    10/1982

(Continued)

OTHER PUBLICATIONS

Patent Abstracts of Japan, publication No.: 10-217941, date of publication of application Aug. 18, 1998, application No. 09-034331, date of filing: Feb. 3, 1997, applicant: Tokico Ltd.

(Continued)

*Primary Examiner*—Edward K. Look
*Assistant Examiner*—Michael Leslie
(74) *Attorney, Agent, or Firm*—RatnerPrestia (57) ABSTRACT

Vacuum brake booster for motor vehicles comprising a booster housing whose interior is subdivided by a movable wall into a vacuum chamber and a working chamber, a control valve that controls a pressure difference acting upon the movable wall and is accommodated in a control housing that carries the movable wall, said control valve being composed of two concentrically arranged sealing seats and an elastically deformable valve member, wherein the control housing includes a cavity through which a cross member extends and delimits the axial movability of a valve piston relative to the control housing, and the cross member includes at least one projection made of an elastic material in the area where the cross member rests against the booster housing. At least one projection made of an elastic material is provided in the area of points of abutment between the control housing and the cross member.

11 Claims, 5 Drawing Sheets

U.S. PATENT DOCUMENTS

| | | | |
|---|---|---|---|
| 4,953,446 A | | 9/1990 | Fecher et al. |
| 5,121,673 A | | 6/1992 | Araki |
| 5,626,069 A | | 5/1997 | Uyama |
| 6,135,007 A | * | 10/2000 | Tsubouchi ................. 91/369.2 |

FOREIGN PATENT DOCUMENTS

| | | |
|---|---|---|
| GB | 2 100 379 A | 12/1982 |
| GB | 2 229 505 A | 9/1990 |
| GB | 2 253 018 A | 8/1992 |

OTHER PUBLICATIONS

Patent Abstracts of Japan, publication No.: 2000-079877, date of publication of application: Mar. 21, 2000, application No.: 10-260303, date of filing: Sep. 14, 1998, applicant: Aisin Seiki Co Ltd.

International Search Report for Application No. PCT/EP03/00735 dated May 5, 2003.

German Search Report for Application No. 102 03 411.7 dated Dec. 10, 2002.

* cited by examiner

VACUUM BRAKE BOOSTER

TECHNICAL FIELD

The present invention relates to a vacuum brake booster for motor vehicles comprising a booster housing whose interior is subdivided by a movable wall into a vacuum chamber and a working chamber, a control valve that controls a pressure difference acting upon the movable wall and is accommodated in a control housing that carries the movable wall, said control valve being composed of two concentrically arranged sealing seats and an elastically deformable valve member, wherein the control housing includes a cavity through which a cross member extends and delimits the axial movability of a valve piston relative to the control housing, and the cross member includes at least one projection made of an elastic material in the area where the cross member rests against the booster housing.

BACKGROUND OF THE INVENTION

GB 2 253 018 A discloses a vacuum brake booster of this type. A cross member described in said publication includes two legs extending into a groove of a valve piston. Two other arcuate legs are provided with elastic projections in order to cushion the abutment of the cross member on a booster housing.

BRIEF SUMMARY OF THE INVENTION

An object of the invention is to provide a vacuum brake booster wherein damping of the abutment noises of the cross member is further improved.

According to the invention, this object is achieved in that at least one projection made of an elastic material is provided in the area of points of abutment between the control housing and the cross member. The term 'projection' herein refers to an elastic component mounted on the cross member and projecting a distance from the abutment surface of the cross member outside the release position or the normal position that exists in the non-assembled condition. The part, which moves to abut on the cross member, will initially come to rest against the projection that is thereby compressed.

In a preferred aspect of the invention, points of abutment between the valve piston and the cross member also include at least one projection made of an elastic material, whereby the abutment of the two parts on each other is damped.

It is important for the functions of the cross member that the parts abutting on each other have a defined distance in the release position. This demand is most reliably satisfied when the parts are in direct abutment on each other, meaning the distance is zero. To achieve this condition, the height of the projection and/or the material of the projection is so chosen in a favorable embodiment that in the release position of the vacuum brake booster the elevation of the projection with respect to its surroundings is considerably smaller than in the normal condition, preferably is negligibly small.

Preferably, the projection is arranged on the cross member in such a fashion that it is able to yield an opposite abutment surface in the release position so that the material of the control housing or of the valve piston and the booster housing rests against the material of the cross member in an essentially direct fashion.

To provide the projection with sufficient space to yield, the projection is arranged in a recess of the cross member according to a favorable improvement. This applies in particular when the cross-sectional surface A1 of the recess is chosen to be larger than the cross-sectional surface A2 of the projection.

Preferably, the projection is attached to the cross member by cementing, casting on, fitting in or vulcanizing. When, according to a favorable improvement, the projection is attached to a lateral surface of the cross member and the projection protrudes from the abutment surface of the cross member, the protruding portion of the projection can swing away or be bent off laterally.

In order not to deteriorate the guiding of the parts movable relative each other in the direction of the longitudinal axis of the valve piston, it is advisable to arrange the projection in the center of the respective abutment area. This arrangement prevents relative tilting of the parts.

The projection is arranged over the entire length of a leg of the cross member according to a favorable improvement.

A corresponding shaping and an appropriate design of the projection is necessary to compensate a change in the condition of a reaction plate when heated and the resultant change in position of the parts resting against each other. As the reaction plate is enclosed in a space formed by the control housing and a push rod, the growth of the reaction plate upon heating manifests itself by expansion of the plate in the longitudinal direction of the push rod, thereby displacing a master brake cylinder piston by a certain distance towards the inlet of the master brake cylinder irrespective of the force exerted by the vacuum brake booster. Said displacement can be compensated by the effect that, upon corresponding heating of the projection, said becomes more yielding when exposed to force and flows into the encompassing free space. It is this way possible that the projection, when subjected to higher temperatures, ensures a smaller distance between abutting parts than at lower temperatures where the projection has a comparatively solid condition.

DETAILED DESCRIPTION OF THE PREFERRED EMBODIMENTS

Figure 1:
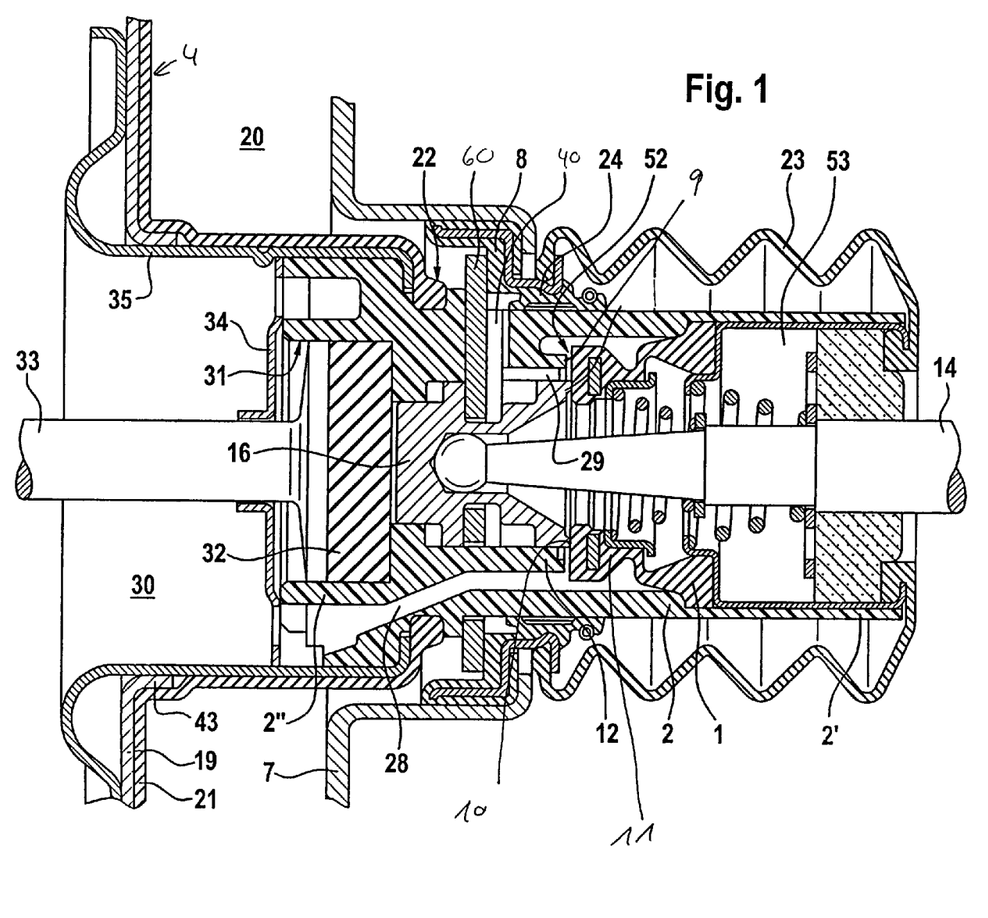
FIG. 1 is a view of the longitudinal cross-section taken through the control housing assembly of a vacuum brake booster.

FIG. 1 shows the longitudinal cross-section through a control housing assembly of a brake booster in the release position. A booster housing 7 is comprised of two housing shells interconnected by lanced indentations at a joint 22, with only the housing shell close to the brake pedal being shown (for the sake of clarity). The interior of the booster housing 7 is subdivided by a booster piston 19 into a vacuum chamber 30, which is connected to a vacuum source by way of a connecting bore (not shown), and a working chamber 20. The booster piston 19 includes a rolling diaphragm 21 abutting in the working chamber 20 on the booster piston 19 and a cylindrically designed control housing 2 connected to the booster piston 19 and the rolling diaphragm 21. Rolling diaphragm 21 is pressure-tightly compressed at the joint 22 and embraces with its inner portion an inside edge 43 of the booster piston 19, sealing said in relation to the control housing 2. Control housing 2 projects with a cylindrical neck 2' from the booster housing 7 and is protected against contamination of its surface by means of a pleated bellows 23. The control housing 2 seals the working chamber 20 towards the outside by means of a sliding guide ring 24. In the interior of the control housing 2, the control rod composed of piston rod 14 and valve piston 16 is axially slidably arranged and connectable to a brake pedal of a motor vehicle by way of a fork head (not illustrated). Further, the control housing 2, 2' contains a control valve 1 which is actuated by the valve piston 16 and controls the pressure difference between vacuum chamber 30 and working chamber 20 by way of channels 28, 29.

In addition, the part of the control housing 2, 2' arranged in the vacuum chamber 30 includes a stepped bore 31 retained in which is a reaction plate 32 and a clamping washer 34 by way of a clamping sleeve 35. A push rod 33 actuates a master brake cylinder (not shown) secured to the frontal end of the bottom of the booster housing 7.

To reset the booster piston 19, a restoring spring is provided (not shown) that is compressed between the clamping sleeve 35 of the booster piston 19 and the bottom of the booster housing 7.

A cross member 60 is slipped from the side into a cavity 40 that is transversely arranged and open radially outwards relative to the working chamber 20. The purpose of the cross member 60 is to limit the axial displacement of the valve piston 16 relative to the control housing 2, 2'. Besides, the cross member 60 ensures that the control housing 2, 2' in the release position moves back into a defined position, shown in more detail in the drawing, relative to the booster housing 7, i.e. it moves so far in the direction of the brake pedal until the control housing 2, by way of the cross member 60, abuts on a stationary stop on the booster housing 7 being configured as bead 8.

The drawing shows the control assembly of the brake booster in the release position, i.e. in a position in which the two chambers 30 and 20 are in connection through a channel 28 and a narrow slot 52 between the control valve 1 and a sealing seat 9 of the control housing 2, while the inflow of atmospheric air into the working chamber 20 is additionally prevented.

Figure 2:
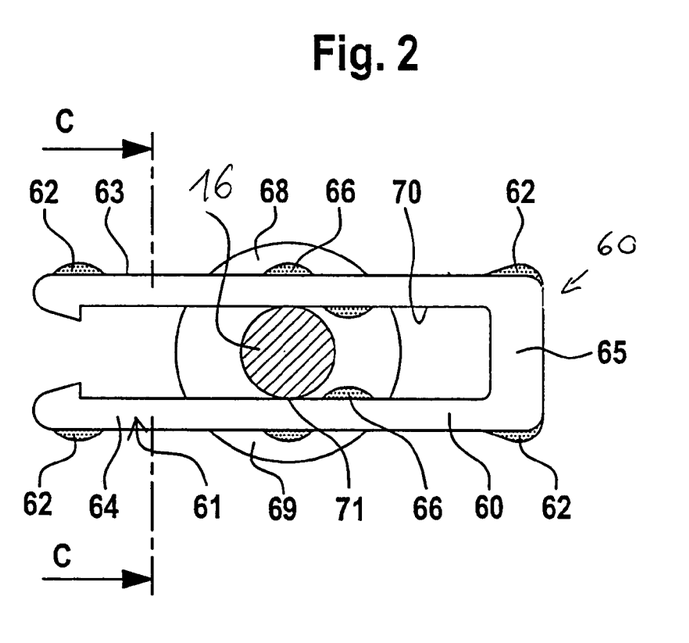
FIGS. 2 and 3 show a first embodiment of a cross member.

FIG. 2 shows a cross member 60 configured as a wedge and generally having a U-shape, thus including two legs 61. Projections 62 in the shape of rubber knobs are cast on at the ends of the two legs 61, namely at lateral surfaces 63. Said projections 62 extend vertically relative to the viewing plane of FIG. 2 and project a portion from a surface 64 of the cross member 60, that means in an upward and downward direction from the viewing plane. The resultant projecting length forms an elevation relative to the surface 64 of the cross member 60. Corresponding projections 62 are provided at a bottom part 65 of the cross member 60 of the legs 61. The booster housing 7 comes to rest against these projections 62.

Additional projections 66 configured as knobs are arranged in the mean zone of legs 61 having the same design as described hereinabove. These additional projections 66 can be secured to an inside surface 70 of legs 61. Projections 66 damp an abutment of the valve piston 16 having a circumferential groove 68 into which the cross member 60 with its leg 61 extends. The abutment surface then forms a lateral wall 69 of groove 68. To prevent the projections 66 disposed at the inside surface 70 of legs 61 from being sheared off by a bottom 71 of groove 68 when the cross member 60 is slipped in, the projections are laterally offset relative to the center line that projects from the plane of projection of the valve piston 16.

The arrangement of the projections 66 as described is appropriate when the diameter of the valve piston 16 is smaller than the width of the cross member 60.

If this is not the case, it is advisable, as indicated in FIG. 2, to arrange the additional projections 66 at the lateral surface 63 of the legs.

Figure 3:
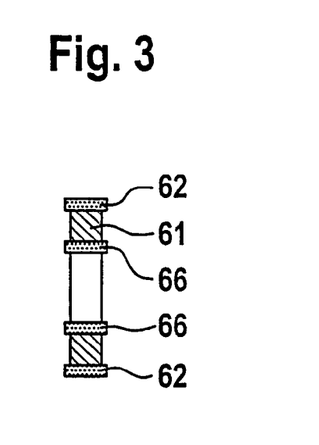

FIG. 3 depicts a cross-section in the plane C—C taken through the cross member 60 shown in FIG. 2 in the direction of the arrows. As is known, the cross member 60 also moves to bear against the control housing 2. Said control housing 2 is generally made of plastics so that the noise of the stop is reduced. In case of need, it is possible to provide further projections to cushion the abutment of the control housing 2.

Figure 4:
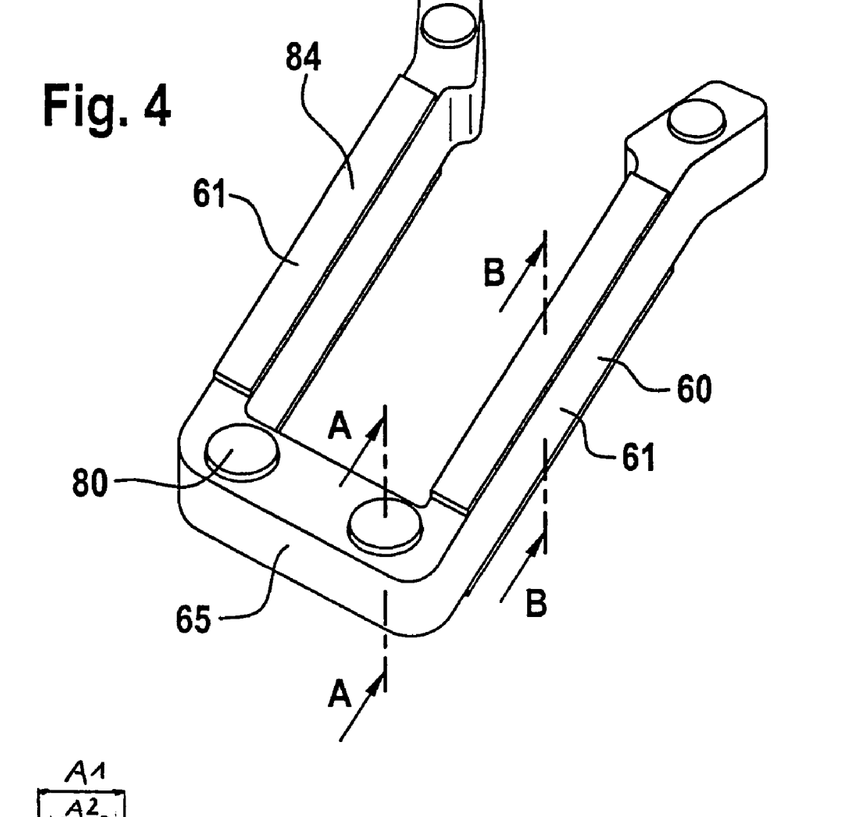
FIGS. 4 to 6 show a second embodiment of a cross member.

FIG. 4 shows a perspective view of a cross member 60 wherein projections 80 are provided at the ends of legs 61 and at the bottom portion 65. Projections 80 are inserted into recesses 81 that have a cross-sectional surface A1 larger than the cross-sectional surface A2 of projections 80. A circumferential space 83 is thus produced, and the projection 80 may flow laterally into the circumferential space 83 under the effect of a force that acts from above on the projection 80 in FIGS. 4 and 5.

Figure 5:
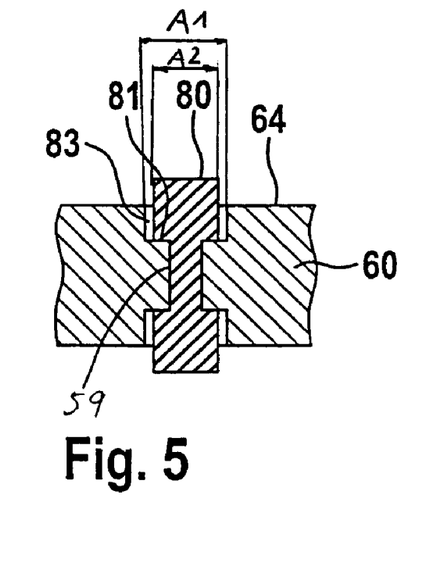

FIG. 5 shows a cross-section in the plane A—A in FIG. 4 where the correlations described are clearly shown. In this arrangement, the projection 80 can project both beyond the top and the bottom surface 64 of the cross member 60 obviating the need for an aligned assembly. As becomes apparent from FIG. 5, two equal portions of projection 80 are integrally connected by way of a mid-portion, and the projection 80 may be made in a casting process. The projection extends through a through-hole 59 in the cross member 60.

It is, however, also possible to insert two equal parts of projection, coming from opposite directions, into the associated recess 81 and attach them there. Attachment can be by cementing or static friction, e.g. by press fitting attachments at the projection parts into the through-hole. Blind-end bores can also be used for this purpose in order not to weaken the material unnecessarily.

Figure 6:
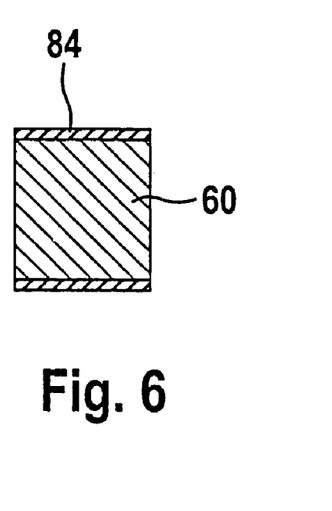

FIG. 6 depicts a cross-section along the plane B—B in FIG. 4. An elastic layer 84 is applied to the surface 64 of the cross member 60 to cushion the abutment of the valve piston 16 and/or the control housing 2. FIG. 5 shows the projecting length of the projection 80 beyond the surface 64 of the cross member 60.

Figure 7:
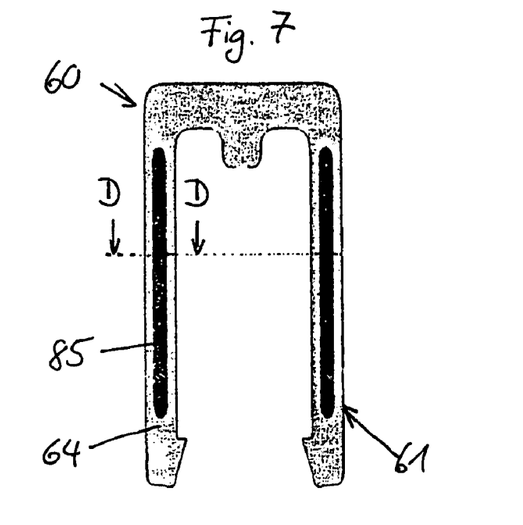
FIGS. 7 to 9 show a third embodiment of a cross member.
Figure 8:
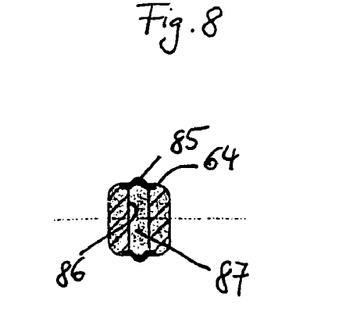
Figure 9:
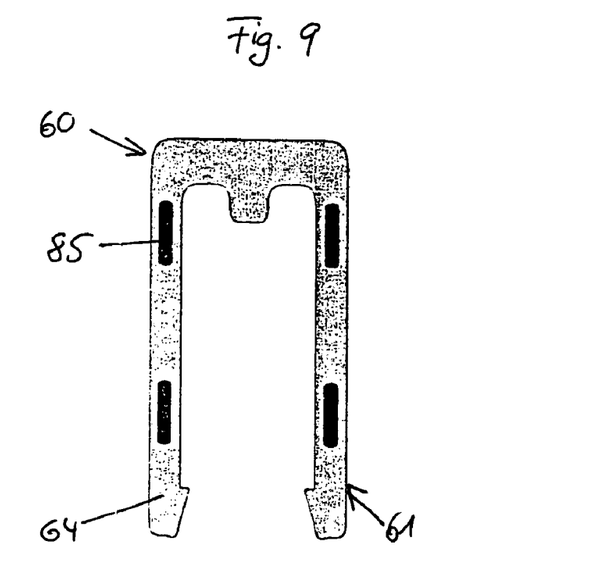

FIG. 7 and the cross-section through the plane D—D illustrated in FIG. 8 show another embodiment of a cross member 60, with the legs 61 of the cross member 60 being provided with cylindrical recesses 86 that extend from the top to the bottom surface 64 of the cross member 60 and almost over the entire length of the legs 61. By way of these recesses 86, elastic projections 85, e.g. elastomeric membranes, are fitted to the surfaces 64, said projections being able to yield into air chambers 87 produced by the recesses 86 in the release position of the vacuum brake booster. It is possible, as shown in FIG. 9, to not arrange the projections 85 over the entire length of the legs 61 but to provide several projections 85 at the respective points of abutment of the cross member 60.

Figure 10:
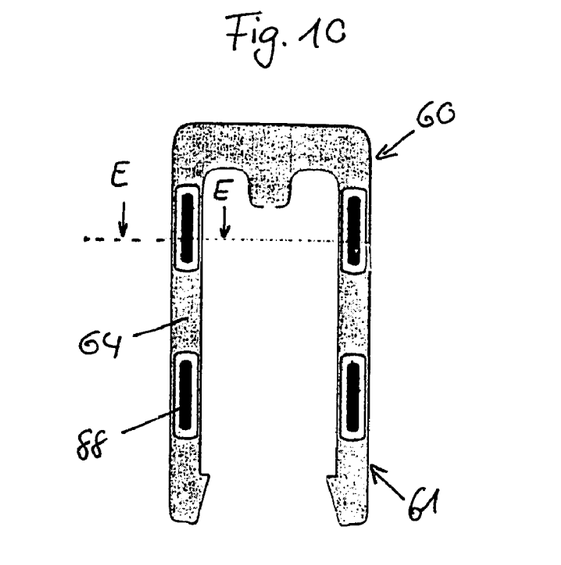
FIGS. 10 and 11 show a fourth embodiment of a cross member.
Figure 11:
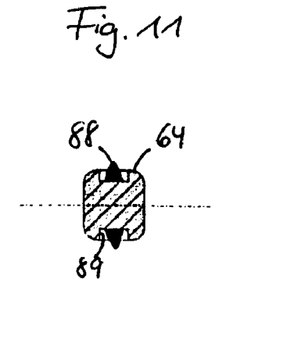

FIGS. 10 and 11 show another embodiment of a cross member 60. It becomes apparent from the cross-section taken through plane E—E that conical projections 88 are mounted in recesses 89 disposed on the surfaces 64 of legs

61, said projections protruding from the surface 64. The diameter of the recesses 89 exceeds the diameter of the projections 88 so that the projections 88 can yield into the recesses 89 in the release position of the vacuum brake booster.

Figure 12:
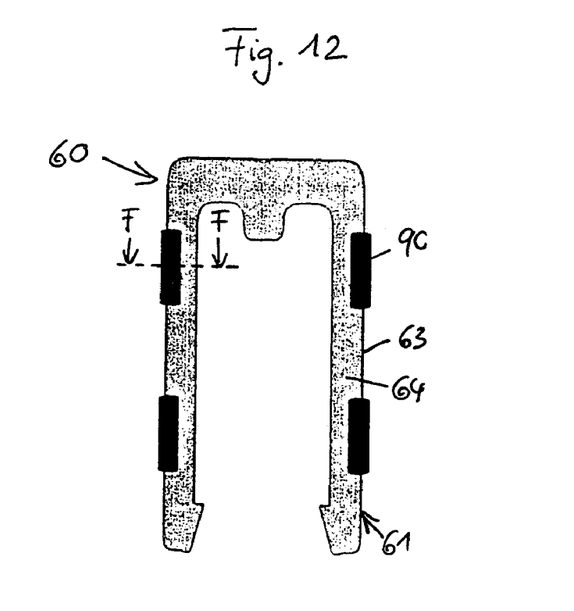
FIGS. 12 and 13 show a fifth embodiment of a cross member.
Figure 13:
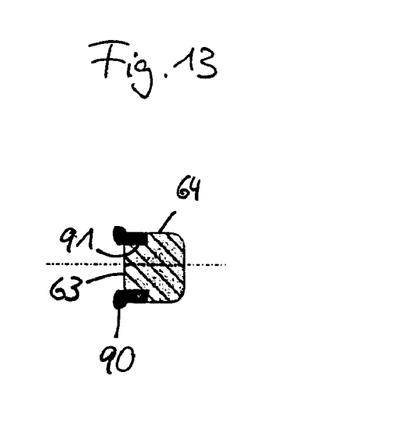

FIG. 12 and FIG. 13 representing a cross-section taken through plane F—F show a fifth embodiment of a cross member 60 wherein an elastic projection 90 arranged in a recess 91 protrudes from the lateral surface 63 and surface 64. The resultant projecting length of the projection 90 will yield laterally in the release position.

As described in FIG. 7, it is possible in the embodiments according to FIGS. 10 to 13 to arrange the elastic projections 88, 90 over the entire length of the legs 61 or to mount several projections 88, 90 according to the points of abutment of the cross member 60.

The following statements can be made with respect to the embodiments illustrated in FIGS. 2 to 13.

Currently, there are two functional criteria in the brake actuating unit which need improvement.
Criterion 1: lost travel
Criterion 2: mechanical wedge abutment noise of the vacuum brake booster when released.

Ad criterion 1: the lost travel depends, among others, on the
  growth of the reaction plate under heat (0.2–0.6 mm, depending on the type of the reaction plate)
  elongation of the valve member of the control valve when exposed to heat and under high pressure (roughly 0.2 mm).

To ensure opening of the control valve at high temperatures and under high pressure, it is necessary to arrange for roughly 0.8 mm, which become apparent as lost travel under normal conditions (e.g. room temperature).

Ad criterion 2: when the vacuum brake booster is released, abutment of the valve piston on the wedge (cross member), on the one hand, and abutment of the wedge on the control housing and the booster housing, on the other hand, cause mechanical abutment noises.

The embodiment of FIGS. 2 to 14 has the following design: In a conventional (or optionally broader) wedge, projections are vulcanized or mounted thereon which counteract both criteria by tuning shape and hardness of the projections as the decisive criterion. These features eliminate the shortcomings described above.

Ad criterion 1:
The projections in the area wedge/booster housing are so configured with respect to shape and hardness that they consolidate in the extent the reaction plate grows.

Thus, growth of the reaction plate can be compensated and need not be taken into account in the analysis of the lost travel. When the rating allows further pressurization of the master cylinder of roughly 0.2 mm, the elongation of the control valve under pressure can also be compensated and removed from the analysis of the lost travel.

It is possible to compensate a variation of the dimension of the plug-shaped push rod end part during adjustment on the assembly line, which is related to this provision, by way of increasing the dimensional tolerance. However, this would eliminate again a fraction of the lost travel reduction (roughly 0.2 mm).

Ad criterion 2:
Projections in the area wedge/valve piston and wedge/control housing must be configured such with respect to shape and hardness that they bring about noise damping upon a first contact and cause metal/metal or metal/plastics contact in the event of full release of the vacuum brake booster. This rating is suitable to maintain a defined dimension in the vacuum brake booster. Damping by means of a rubber layer is alternatively feasible herein.

LIST OF REFERENCE NUMERALS

1 control valve
2 control housing
2' neck
4 wall
7 booster housing
8 bead
9 sealing seat
10 sealing seat
11 valve member
12 valve seat
14 piston rod
16 valve piston
19 booster piston
20 working chamber
21 rolling diaphragm
22 joint
23 pleated bellows
24 sliding guide ring
28 channel
29 channel
30 pressure chamber
31 stepped bore
32 reaction plate
33 push rod
34 clamping spacer
35 clamping sleeve
40 cavity
43 inside edge
52 slot
59 through-hole
60 cross member
61 leg
62 projection
63 lateral surface
64 surface
65 bottom part
66 projection
68 groove
69 lateral wall
70 inside surface
71 bottom
80 projection
81 recess
83 space
84 layer
85 projection
86 recess
87 air chamber
88 projection
89 recess
90 projection
91 recess

The invention claimed is:
1. Vacuum brake booster for motor vehicles comprising a booster housing whose interior is subdivided by a movable wall into a vacuum chamber and a working chamber, a control valve that controls a pressure difference acting upon the movable wall and is accommodated in a control housing that carries the movable wall, said control valve being composed of two concentrically arranged sealing seats and an elastically deformable valve member, wherein the control housing includes a cavity through which a cross member extends and delimits the axial movability of a valve piston relative to the control housing, and the cross member includes at least one projection made of an elastic material in the area where the cross member rests against the booster housing, the cross member further comprising a recess surrounding the at least one projection and forming a clearance space to accommodate lateral flow of the at least one projection in response to force acting on the at least one projection, wherein at least one projection made of an elastic material is provided in the area of points of abutment between the control housing and the cross member, wherein said projections are attached to the cross member by cementing, casting on, fitting in or vulcanizing.

2. Vacuum brake booster as claimed in claim 1, wherein at least one projection made of an elastic material is provided in the area of points of abutment between the valve piston and the cross member.

3. Vacuum brake booster as claimed in claim 1, wherein the height of said projections or the material of said projections is so chosen that, in the release position, the elevation of each of said projections with respect to its surroundings is smaller than in the normal condition.

4. Vacuum brake booster as claimed in claim 1, wherein one or more of said projections are arranged in the center of the respective abutment area.

5. Vacuum brake booster as claimed in claim 1, wherein one or more of said projections are is arranged over the entire length of a leg of the cross member.

6. Vacuum brake booster for motor vehicles comprising a booster housing whose interior is subdivided by a movable wall into a vacuum chamber and a working chamber, a control valve that controls a pressure difference acting upon the movable wall and is accommodated in a control housing that carries the movable wall, said control valve being composed of two concentrically arranged sealing seats and an elastically deformable valve member, wherein the control housing includes a cavity through which a cross member extends and delimits the axial movability of a valve piston relative to the control housing, and the cross member includes at least one projection made of an elastic material in the area where the cross member rests against the booster housing, wherein at least one projection made of an elastic material is provided in the area of points of abutment between the control housing and the cross member wherein the projection is arranged on the cross member in such a fashion that it is able to give way to an opposite abutment surface in the release position so that the material of the control housing and the booster housing rests directly against the material of the cross member.

7. Vacuum brake booster as claimed in claim 6, wherein one or more of said projections are arranged in a recess of the cross member.

8. Vacuum brake booster as claimed in claim 7, wherein the cross-sectional surface of the recess is chosen to be larger than the cross-sectional surface of the projection.

9. Vacuum brake booster as claimed in claim 6, wherein one or more of said projections are attached to the cross member by cementing, casting on, fitting in or vulcanizing.

10. Vacuum brake booster for motor vehicles comprising a booster housing whose interior is subdivided by a movable wall into a vacuum chamber and a working chamber, a control valve that controls a pressure difference acting upon the movable wall and is accommodated in a control housing that carries the movable wall, said control valve being composed of two concentrically arranged sealing seats and an elastically deformable valve member, wherein the control housing includes a cavity through which a cross member extends and delimits the axial movability of a valve piston relative to the control housing, and the cross member includes at least one projection made of an elastic material in the area where the cross member rests against the booster housing, wherein at least one projection made of an elastic material is provided in the area of points of abutment between the control housing and the cross member, wherein one or more of said projections are arranged on the cross member in such a fashion that it is able to give way to an opposite abutment surface in the release position so that the material of the control housing or of the valve piston and the booster housing rests directly against the material of the cross member and one or more of said projections are attached to a lateral surface of the cross member by cementing, casting on, fitting in or vulcanizing.

11. Vacuum brake booster including a reaction plate for motor vehicles comprising a booster housing whose interior is subdivided by a movable wall into a vacuum chamber and a working chamber, a control valve that controls a pressure difference acting upon the movable wall and is accommodated in a control housing that carries the movable wall, said control valve being composed of two concentrically arranged sealing seats and an elastically deformable valve member, wherein the control housing includes a cavity through which a cross member extends and delimits the axial movability of a valve piston relative to the control housing, and the cross member includes at least one projection made of an elastic material in the area where the cross member rests against the booster housing, wherein at least one projection made of an elastic material is provided in the area of points of abutment between the control housing and the cross member wherein the height of said projections and the material of said projections is so chosen that, in the release position, the elevation of each of said projections with respect to its surroundings is smaller than in the normal condition, wherein the material and the arrangement of said projections is chosen such that, with respect to the lost travel, a temperature-responsive growth of the reaction plate is compensated by a corresponding temperature-responsive reduction of the elevation of said projections.

* * * * *